(12) United States Patent
Takaira et al.

(10) Patent No.: US 10,137,774 B2
(45) Date of Patent: Nov. 27, 2018

(54) CONTROL DEVICE FOR 4WD VEHICLE

(71) Applicant: Toyota Jidosha Kabushiki Kaisha, Toyota-shi, Aichi-ken (JP)

(72) Inventors: Koji Takaira, Okazaki (JP); Kunihiro Iwatsuki, Toyota (JP); Hiroyuki Ishii, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 484 days.

(21) Appl. No.: 14/708,607

(22) Filed: May 11, 2015

(65) Prior Publication Data
US 2015/0328982 A1    Nov. 19, 2015

(30) Foreign Application Priority Data

May 13, 2014  (JP) ................................. 2014-100024

(51) Int. Cl.
| | |
|---|---|
| B60K 23/08 | (2006.01) |
| B60K 17/35 | (2006.01) |
| B60W 10/119 | (2012.01) |
| B60W 10/14 | (2012.01) |

(52) U.S. Cl.
CPC .......... *B60K 23/08* (2013.01); *B60K 17/3515* (2013.01); *B60K 23/0808* (2013.01); *B60W 10/119* (2013.01); *B60W 10/14* (2013.01); *B60K 2023/0858* (2013.01)

(58) Field of Classification Search
CPC ........ B60K 17/3515; B60K 2023/0858; B60K 23/08; B60K 23/0808; B60W 10/119; B60W 10/14
See application file for complete search history.

(56) References Cited

U.S. PATENT DOCUMENTS

| | | | | | |
|---|---|---|---|---|---|
| 4,702,341 | A | * | 10/1987 | Taga .................. | B60K 23/0808 180/249 |
| 4,715,466 | A | * | 12/1987 | Ishii ..................... | B60K 17/358 180/233 |
| 4,827,807 | A | * | 5/1989 | Hayakawa ........... | B60K 17/344 180/247 |

(Continued)

FOREIGN PATENT DOCUMENTS

| | | |
|---|---|---|
| JP | 01-123938 U | 8/1989 |
| JP | 04-297335 A | 10/1992 |

(Continued)

*Primary Examiner* — Joseph M Rocca
*Assistant Examiner* — Maurice L Williams
(74) *Attorney, Agent, or Firm* — Dinsmore & Shohl LLP

(57) ABSTRACT

Control device for a 4WD vehicle is provided. The 4WD vehicle includes a driving force source, main driving wheels, auxiliary driving wheels, a driving force transmission shaft, a first disconnection mechanism, and a second disconnection mechanism. The first disconnection mechanism and the second disconnection mechanism are engaged during 4WD traveling. One of the first disconnection mechanism and the second disconnection mechanism is a clutch. The control device includes an electronic control unit. The electronic control unit is configured to execute engagement control for controlling the engagement force of the clutch so that the driving force transmission shaft is maintained in a state prior to the initiation of a continuous increase in the rotation speed of the driving force transmission shaft.

12 Claims, 5 Drawing Sheets

(56) References Cited

U.S. PATENT DOCUMENTS

| | | | | |
|---|---|---|---|---|
| 4,858,646 A | * | 8/1989 | Kato | B60K 23/0808 137/596.16 |
| 5,644,916 A | * | 7/1997 | Hayasaki | B60K 23/0808 192/109 F |
| 5,839,084 A | * | 11/1998 | Takasaki | B60K 17/35 180/197 |
| 7,059,460 B2 | * | 6/2006 | Duan | F16D 25/123 192/70.12 |
| 8,483,921 B2 | * | 7/2013 | Sakagami | B60K 23/00 180/247 |
| 2003/0150685 A1 | * | 8/2003 | Iida | B60W 30/186 192/82 T |
| 2010/0094519 A1 | | 4/2010 | Quehenberger et al. | |
| 2013/0220722 A1 | | 8/2013 | Mita | |
| 2014/0336001 A1 | * | 11/2014 | Imafuku | B60K 23/08 477/35 |

FOREIGN PATENT DOCUMENTS

| | | |
|---|---|---|
| JP | 2010-100280 A | 5/2010 |
| JP | 2011-143790 A | 7/2011 |
| JP | 2013-177093 A | 9/2013 |

* cited by examiner

CONTROL DEVICE FOR 4WD VEHICLE

INCORPORATION BY REFERENCE

The disclosure of Japanese Patent Application No. 2014-100024 filed on May 13, 2014 including the specification, drawings and abstract is incorporated herein by reference in its entirety.

BACKGROUND OF THE INVENTION

1. Field of the Invention

The invention relates to a control device that switches operation states of two disconnect mechanisms in accordance with a traveling state of a 4WD vehicle. The two disconnect mechanisms are two disconnection mechanisms that are disposed on a driving force source side and an auxiliary driving wheels side of a driving force transmission shaft, respectively.

2. Description of Related Art

4WD vehicles that are provided with two disconnection mechanisms as disconnect mechanisms are widely known. The two disconnection mechanisms are disposed on a driving force source side and an auxiliary driving wheels side of a driving force transmission shaft (for example, propeller shaft), respectively. The driving force transmission shaft is configured to transmit power of the driving force source during 4WD traveling to the auxiliary driving wheels side becoming driven wheels during 2WD traveling. One of the examples is a vehicle that is described in Japanese Patent Application Publication No. 2010-100280 (JP 2010-100280 A). In this 4WD vehicle, the two disconnection mechanisms are released during 2WD traveling. Accordingly, the rotation of the driving force transmission shaft and the like between the two disconnection mechanisms can be stopped. In this case, fuel efficiency can be improved compared to a case where only one of the two disconnection mechanisms is released during 2WD traveling. In addition, various techniques have been proposed with regard to control for transition from 2WD traveling to 4WD traveling in the 4WD vehicle. In JP 2010-100280 A, for example, control is performed so that a torque-variable multi-plate clutch (corresponding to one of the two disconnection mechanisms) is engaged. Accordingly, the rotation of a torque transmission section (corresponding to the rotation of the propeller shaft) is increased in accordance with a predetermined velocity gradient. JP 2010-100280 A discloses a technique for engaging a dog clutch when a relative rotation speed of the dog clutch (corresponding to the other one of the two disconnection mechanisms) is substantially synchronized. In addition, JP 2010-100280 A discloses a technique for learning-correct the torque of the multi-plate clutch during the engagement by comparing the acceleration of the rotation of the torque transmission section to a desired velocity gradient.

SUMMARY OF THE INVENTION

In a case where the rotation of the propeller shaft is accelerated by the engagement of the multi-clutch as in JP 2010-100280 A, the release clearance of the multi-plate clutch is filled before the initiation of the acceleration of the rotation of the propeller shaft, and thus a predetermined period of time is required. According to the technique disclosed in JP 2010-100280 A, engagement control for the multi-plate clutch at transition from 2WD traveling to 4WD traveling is initiated when a wheel slip is detected. Accordingly, there is room for improvement relating to shortening of the time until the initiation of the acceleration of the rotation of the propeller shaft after a moment when the transition from 2WD traveling to 4WD traveling becomes essential (for example, wheel slip occurrence moment). The problem described above is not known. Also, no technique has been proposed with regard to improving the responsiveness of control after the moment when the transition from 2WD traveling to 4WD traveling becomes essential.

The invention provides a control device for a 4WD vehicle that improves the responsiveness of control for transition from 2WD traveling to 4WD traveling which is executed after a moment when determination for the transition from 2WD traveling to 4WD traveling is performed.

According to a first aspect of the invention, there is provided a control device for a 4WD vehicle. The 4WD vehicle includes a driving force source, main driving wheels, auxiliary driving wheels, a driving force transmission shaft, a first disconnection mechanism, and a second disconnection mechanism. The driving force transmission shaft is configured to transmit part of power of the driving force source transmitted to the main driving wheels to the auxiliary driving wheels during 4WD traveling. The first disconnection mechanism is disposed on the driving force source side of the driving force transmission shaft. The second disconnection mechanism is disposed on the auxiliary driving wheels side of the driving force transmission shaft. The first disconnection mechanism and the second disconnection mechanism are configured to disconnect a power transmission path between the driving force source and the auxiliary driving wheels. The 4WD traveling is traveling with the first disconnection mechanism and the second disconnection mechanism being engaged. One of the first disconnection mechanism and the second disconnection mechanism is a clutch. The clutch has a first rotating member and a second rotating member configured to rotate relative to the first rotating member. The clutch is configured to control an engagement force while synchronizing the rotation speed of the first rotating member and the rotation speed of the second rotating member. The control device includes an electronic control unit. The electronic control unit is configured to execute engagement control for controlling the engagement force of the clutch such that the driving force transmission shaft is maintained in a state prior to the initiation of a continuous increase in the rotation speed of the driving force transmission shaft.

According to the aspect described above, the engagement force of the clutch can be controlled so that the driving force transmission shaft is in a state immediately prior to the initiation of the continuous increase in the rotation speed of the driving force transmission shaft. Accordingly, the responsiveness of the control of the engagement force of the clutch for the initiation of the continuous increase in the rotation speed of the driving force transmission shaft can be improved. From another point of view, the initiation of the engagement control for controlling the engagement force of the clutch is not at a moment when a transition to the 4WD traveling is determined (4WD function essential moment). Accordingly, the driving force transmission shaft can be in a state immediately prior to the initiation of the continuous increase in the rotation speed of the driving force transmission shaft with a margin. Accordingly, the responsiveness of the control for transition to 4WD traveling that is executed after the moment of determination for transition to 4WD traveling can be improved.

In the aspect described above, the electronic control unit may be configured to control the engagement force of the clutch based on a temperature of a hydraulic oil at the initiation of the engagement control. The hydraulic oil may lubricate at least the first rotating member or the second rotating member. The clutch may be configured to cause an increase of the rotation speed of the first rotating member or the rotation speed of the second rotating member as a result of the engagement of the clutch. In a general temperature range, the drag torque of the rotating member increases when the hydraulic oil temperature is low, and thus a significant engagement force is required to maintain the driving force transmission shaft in a state prior to the initiation of the continuous increase in the rotation speed of the driving force transmission shaft. With respect to this, an appropriate engagement force can be achieved for the engagement force of the clutch according to the aspect described above. In addition, in a case where the hydraulic oil temperature is high, the engagement force of the clutch may be a smaller engagement force than in a case where the hydraulic oil temperature is low. Accordingly, excessive energy consumption for generating a more-than-necessary engagement force can be suppressed.

In the aspect described above, the electronic control unit may be configured to: (a) increase the engagement force in executing the engagement control continuously or in stages; and (b) hold the engagement force at a first value after the initiation of the increase in the rotation speed of the driving force transmission shaft. The first value may be lower by a predetermined value than a value of the engagement force at the initiation of the increase in the rotation speed of the driving force transmission shaft. According to the aspect described above, the driving force transmission shaft can be appropriately maintained in a state prior to the initiation of a continuous increase in the rotation speed of the driving force transmission shaft.

In the aspect described above, the electronic control unit may be configured to control the engagement force at the first value at an initiation of the subsequent engagement control. According to the aspect described above, the driving force transmission shaft is promptly maintained in a state prior to the initiation of a continuous increase in the rotation speed of the driving force transmission shaft.

In the aspect described above, the electronic control unit may be configured to determine whether or not to perform the transition to the 4WD traveling during 2WD traveling. The 2WD traveling may be traveling with the first disconnection mechanism and the second disconnection mechanism being released. The electronic control unit may be configured to determine whether or not the 4WD vehicle is in a predetermined traveling state when the transition to the 4WD traveling is not determined. The electronic control unit may be configured to execute the engagement control in a case where the electronic control unit determines that the 4WD vehicle is in the predetermined traveling state. According to the aspect described above, the engagement force of the clutch can be controlled so that the driving force transmission shaft is in a state immediately prior to the initiation of the continuous increase in the rotation speed of the driving force transmission shaft when the transition to the 4WD traveling is not determined and the 4WD vehicle is in the predetermined traveling state. Accordingly, the responsiveness of the control of the engagement force of the clutch for the initiation of the continuous increase in the rotation speed of the driving force transmission shaft can be improved. From another point of view, the initiation of the control of the engagement force of the clutch is not at the moment when the transition to the 4WD traveling is determined (4WD function essential moment), and thus the driving force transmission shaft can be in a state immediately prior to the initiation of the continuous increase in the rotation speed of the driving force transmission shaft with a margin.

In the aspect described above, the electronic control unit may be configured to determine that the 4WD vehicle is in the predetermined traveling state (i) when the electronic control unit predicts that a predetermined vehicle wheel speed difference occurs between the main driving wheels and the auxiliary driving wheels or (ii) when the electronic control unit predicts that any one of an understeer state and an oversteer state occurs during the 2WD traveling. According to the aspect described above, the engagement force in controlling the engagement force of the clutch can be controlled in the traveling state where the transition to the 4WD traveling is likely to be determined so that the driving force transmission shaft is maintained in a state prior to the initiation of a continuous increase in the rotation speed of the driving force transmission shaft.

In the aspect described above, the electronic control unit may be configured to predict whether or not the predetermined vehicle wheel speed difference occurs or predict whether or not any one of the understeer state and the oversteer state occurs based on at least one of states of a low $\mu$ road, an uphill road, or steering. According to the aspect described above, the occurrence of the predetermined vehicle wheel speed difference or the occurrence of any one of the understeer state and the oversteer state can be appropriately predicted.

In the aspect described above, the electronic control unit may be configured to determine whether or not to perform the transition to the 4WD traveling by (i) the electronic control unit determining whether or not the predetermined vehicle wheel speed difference occurs between the main driving wheels and the auxiliary driving wheels or (ii) the electronic control unit determining whether or not any one of the understeer state and the oversteer state occurs during the 2WD traveling and increase the engagement force in executing the engagement control so that the clutch is engaged in a case where the electronic control unit determines the transition to the 4WD traveling. According to the aspect described above, the rotation speed of the driving force transmission shaft is promptly and continuously increased by controlling the engagement force of the clutch from the moment of determination for transition to the 4WD traveling.

In the aspect described above, the 4WD vehicle may further include an automatic transmission disposed in a power transmission path between the driving force source and the main driving wheels. The electronic control unit may be configured to determine, during the 2WD traveling, that the 4WD vehicle is in the predetermined traveling state when a manual transmission device is operated by a driver or when a snow mode is selected by a mode selection device being operated by the driver. The manual transmission device may be configured to manually shift the automatic transmission. The mode selection device may have a predetermined normal mode and a predetermined snow mode in which a gear ratio on a high vehicle speed side of the automatic transmission is likely to be selected compared to the predetermined normal mode. According to the aspect described above, in the traveling state where the shift of the automatic transmission is likely to be executed and transition to the 4WD traveling is preferable, the engagement force in controlling the engagement force of the clutch can be controlled so that the driving force transmission shaft is maintained in a state prior to the initiation of the continuous increase in the rotation speed of the driving force transmission shaft.

In the aspect described above, the electronic control unit may be configured to determine, during the 2WD traveling, whether or not to perform the transition to the 4WD traveling by determining whether or not the shift of the automatic transmission is initiated in a case where the electronic control unit determines that the 4WD vehicle is in the predetermined traveling state by the operation being performed by the driver and increase the engagement force in executing the engagement control so that the clutch is engaged in a case where the electronic control unit determines the transition to the 4WD traveling by determining that the shift of the automatic transmission is initiated. According to the aspect described above, the rotation speed of the driving force transmission shaft is promptly and continuously increased by controlling the engagement force of the clutch from the moment of determination for transition to the 4WD traveling. In addition, control for transition to the 4WD traveling can be executed for misleading into a shift shock for the automatic transmission. In this case, the rotation speed of the driving force transmission shaft is promptly and continuously increased as described above, and thus a shift control delay is suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3B is executed.

DETAILED DESCRIPTION OF EMBODIMENTS

Hereinafter, embodiments of the invention will be described in detail with reference to the accompanying drawings.

Figure 1:
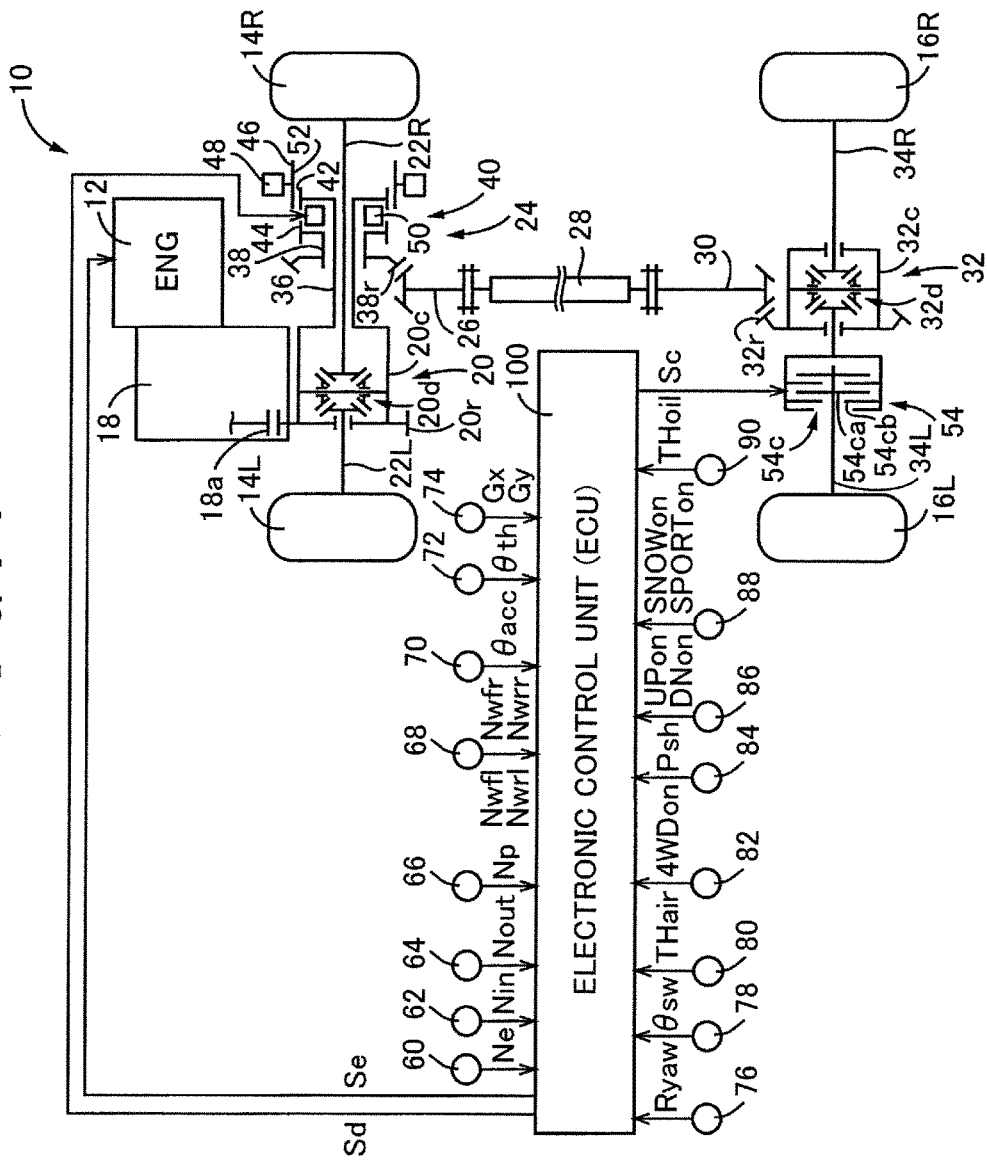
FIG. 1 is a skeleton diagram showing a schematic configuration of a 4WD vehicle to which the invention is applied and is a diagram showing a main part of a control system of the vehicle.

FIG. 1 is a skeleton diagram showing a schematic configuration of a 4WD vehicle 10 (hereinafter, referred to as a vehicle 10) to which the invention is applied. Also, FIG. 1 is a diagram showing a main part of a control system for various types of control in the vehicle 10. According to FIG. 1, the vehicle 10 is provided with an engine 12, right and left front wheels 14R, 14L (hereinafter, referred to as front wheels 14 if not particularly distinguished), right and left rear wheels 16R, 16L (hereinafter, referred to as rear wheels 16 if not particularly distinguished), a first power transmission path that is a power transmission path between the engine 12 and the front wheels 14 and transmits the power of the engine 12 to the front wheels 14, a second power transmission path that is a power transmission path between the engine 12 and the rear wheels 16 and transmits the power of the engine 12 to the rear wheels 16, and the like.

The engine 12 is an internal combustion engine such as a gasoline engine and a diesel engine. The engine 12 is a driving force source that generates a driving force. The front wheels 14 are main driving wheels that are driving wheels for both 2WD traveling and 4WD traveling. The rear wheels 16 are auxiliary driving wheels that are driven wheels during 2WD traveling and driving wheels during 4WD traveling to which the power from the engine 12 is transmitted via the second power transmission path. Accordingly, the vehicle 10 is a FF-based 4WD vehicle.

The first power transmission path is provided with a transmission 18, a front differential 20, right and left front wheel axles 22R, 22L (hereinafter, referred to as front wheel axles 22 if not particularly distinguished), and the like. The second power transmission path is provided with the transmission 18, a transfer 24 that is a front-rear wheel power distribution device which distributes part of the power of the engine 12 transmitted to the front wheels 14 to the rear wheels 16, a driven pinion 26, a propeller shaft 28 that is a driving force transmission shaft which transmits the power from the engine 12 distributed by the transfer 24 to the rear wheels 16 during 4WD traveling, a drive pinion 30, a rear differential 32, right and left rear wheel axles 34R, 34L (hereinafter, referred to as rear wheel axles 34 if not particularly distinguished), and the like.

The transmission 18 constitutes a part of a power transmission path that is common to the first power transmission path between the engine 12 and the front wheels 14 and the second power transmission path between the engine 12 and the rear wheels 16 and transmits the power of the engine 12 to the front wheels 14 side and the rear wheels 16 side. The transmission 18 is an automatic transmission such as a known planetary gear-type multi-speed transmission in which a plurality of gearshift stages having different gear ratios (transmission gear ratios) γ (=transmission input rotation speed Nin/transmission output rotation speed Nout) are selectively satisfied, a known continuously variable transmission in which the gear ratios γ change steplessly and continuously, and a known synchromesh-type parallel two-shaft transmission.

The front differential 20 is configured to include a differential case 20c and a differential mechanism 20d that has a bevel gear. The front differential 20 is a known differential gear that transmits rotation while applying an appropriate differential rotation to the right and left front wheel axles 22R, 22L. A ring gear 20r is disposed in the differential case 20c. The ring gear 20r meshes with an output gear 18a that is an output rotating member of the transmission 18. Accordingly, the power that is output from the transmission 18 is input to the ring gear 20r.

The transfer 24 is disposed in parallel to the front differential 20 as a rotating member that constitutes a part of the first power transmission path and is connected to the front differential 20. The transfer 24 is configured to include a first rotating member 36, a second rotating member 38, and a front side clutch 40.

The first rotating member 36 has a substantially cylindrical shape. The front wheel axle 22R penetrates an inner circumferential side of the first rotating member 36. Fitting teeth that are fitted into fitting teeth (not illustrated) which are disposed in the differential case 20c of the front differential 20 are disposed on one axial side of the first rotating member 36. The first rotating member 36 is integrally connected to the differential case 20c (that is, integrally rotates with the differential case 20c). Clutch teeth 42 that constitute a part of the front side clutch 40 are disposed on the other axial side of the first rotating member 36.

The second rotating member 38 has a substantially cylindrical shape. The front wheel axle 22R and the first rotating member 36 penetrate an inner circumferential side of the second rotating member 38. A ring gear 38r that is used to transmit the power of the engine 12 to the rear wheels 16 side and meshes with the driven pinion 26 is disposed on one axial side of the second rotating member 38. Clutch teeth 44 that constitute a part of the front side clutch 40 are disposed on the other axial side of the second rotating member 38. The driven pinion 26 that meshes with the ring gear 38r is connected to the propeller shaft 28 and is connected to the drive pinion 30 via the propeller shaft 28.

The front side clutch 40 is a clutch for selective disconnection between the first rotating member 36 and the second rotating member 38. The front side clutch 40 is a dog clutch (that is, a mesh clutch) that is configured to include the clutch teeth 42, the clutch teeth 44, a sleeve 46, a holding member 48, and a front side actuator 50. The sleeve 46 has a substantially cylindrical shape. Inner circumferential teeth 52 that can mesh with the clutch teeth 42 and the clutch teeth 44 are disposed on an inner circumferential side of the sleeve 46. The sleeve 46 is configured to be axially moved by the front side actuator 50 that can be, for example, electrically (electromagnetically) controlled. In addition, the front side clutch 40 may be provided with a synchronization mechanism (synchro mechanism).

FIG. 1 illustrates a state where the front side clutch 40 is released. In this state, the connection between the first rotating member 36 and the second rotating member 38 is cut off, and thus the power of the engine 12 is not transmitted to the rear wheels 16. If the sleeve 46 is moved and both the clutch teeth 42 and the clutch teeth 44 mesh with the inner circumferential teeth 52, the front side clutch 40 is engaged and the first rotating member 36 and the second rotating member 38 are connected to each other. Accordingly, when the first rotating member 36 rotates, the second rotating member 38, the driven pinion 26, the propeller shaft 28, and the drive pinion 30 rotate in conjunction. In this manner, the front side clutch 40 is a disconnection mechanism (first disconnection mechanism) that is disposed on the engine 12 side of the propeller shaft 28. The disconnection mechanism disconnects the power transmission path between the front differential 20 and the propeller shaft 28 (that is, the second power transmission path).

The rear differential 32 is configured to include a differential case 32c and a differential mechanism 32d that has a bevel gear. The rear differential 32 is a known differential gear that transmits rotation while applying an appropriate differential rotation to the right and left rear wheel axles 34R, 34L. A ring gear 32r is disposed in the differential case 32c. The ring gear 32r meshes with the drive pinion 30. Accordingly, the power of the engine 12 that is distributed by the transfer 24 is input to the ring gear 32r via the propeller shaft 28 and is transmitted to the rear wheels 16 via the rear differential 32.

In addition, the vehicle 10 is provided with a coupling 54 that constitutes a part of the second power transmission path. The coupling 54 is disposed between the rear differential 32 and the rear wheel axle 34L on the left side. The coupling 54 is, for example, a known electronically-controlled coupling that has a wet multi-plate clutch 54c, an electromagnetic solenoid (not illustrated) as a rear side actuator, and the like. The coupling 54 performs torque transmission between the rear differential 32 and the rear wheel axle 34L on the left side. The multi-plate clutch 54c is a friction clutch that has a plurality of inside clutch plates 54ca (first rotating members) and a plurality of outside clutch plates 54cb (second rotating members) as rotating members relative to each other. The driving force that is transmitted to the rear wheels 16 is controlled when, for example, an engagement force of the multi-plate clutch 54c of the coupling 54 (that is, a transmission torque of the coupling 54) is controlled.

Specifically, the propeller shaft 28 and the rear wheel axle 34L on the left side are connected to be capable of transmitting torque via the rear differential 32 and the like when the coupling 54 is engaged. In addition, the propeller shaft 28 and the rear wheel axle 34R on the right side are connected to be capable of transmitting torque via the rear differential 32 and the like when the coupling 54 is engaged. The torque from the propeller shaft 28 is not transmitted to the rear wheel axle 34L on the left side when the coupling 54 is released. As the torque from the propeller shaft 28 is not transmitted to the rear wheel axle 34L on the left side, the torque from the propeller shaft 28 is not transmitted to the rear wheel axle 34R on the right side, either. In other words, the torque from the propeller shaft 28 is not transmitted to the rear wheel axle 34R on the right side as well due to the general characteristics of the rear differential 32 as a differential gear. When a current is supplied to the electromagnetic solenoid (not illustrated) described above, the multi-plate clutch 54c is engaged at an engagement force proportional to the current value in the coupling 54. As the transmission torque of the coupling 54 increases, the driving force that is transmitted to the rear wheels 16 increases. With the transmission torque controlled, the coupling 54 can continuously change the torque distribution between the front wheels 14 and the rear wheels 16 between, for example, 100:0 to 50:50. In this manner, the coupling 54 is a disconnection mechanism (second disconnection mechanism) that is disposed on the rear wheels 16 side of the propeller shaft 28. The disconnection mechanism disconnects the power transmission path between the propeller shaft 28 and the rear wheels 16 (that is, the second power transmission path). The coupling 54 is a clutch in which the transmission torque can be controlled between release and engagement. Accordingly, the coupling 54 is a clutch in which an engagement force can be controlled during a process for synchronizing the respective rotation speeds of the inside clutch plate 54ca and the outside clutch plate 54cb.

In the vehicle 10 that has the configuration described above, the driving force corresponding to the transmission torque of the coupling 54 is transmitted to the rear wheels 16 as well if, for example, the front side clutch 40 is engaged and the transmission torque of the coupling 54 is controlled to be a value exceeding zero. Accordingly, power is transmitted to both the front wheels 14 and the rear wheels 16 for 4WD traveling. During this 4WD traveling, the transmission torque of the coupling 54 is controlled and the torque distribution between the front wheels 14 and the rear wheels 16 is adjusted as needed.

In the vehicle 10, the connection between the first rotating member 36 and the second rotating member 38 is cut off if, for example, the front side clutch 40 is released. Accordingly, power is not transmitted to the rear wheels 16, and thus only the front wheels 14 are driven for 2WD traveling.

If, for example, the coupling 54 that is an example of a rear side clutch is released in addition, rotation is transmitted neither from the engine 12 side nor from the rear wheels 16 side to the respective rotating elements which constitute the power transmission path from the second rotating member 38 to the differential case 32c during the 2WD traveling. The respective rotating elements refer to the second rotating member 38, the driven pinion 26, the propeller shaft 28, the drive pinion 30, the differential case 32c, and the like. Accordingly, during the 2WD traveling, the respective rotating elements stop rotating. Accordingly, the respective rotating elements are prevented from rotating in conjunction, and traveling resistance is reduced. The front side clutch 40 and the coupling 54 are two disconnection mechanisms that are respectively disposed on the engine 12 side and the rear wheels 16 side of the propeller shaft 28 so as to stop the rotation of the a predetermined rotating element. The predetermined rotating element refers to a rotating element that transmits power to the rear wheels 16 during 4WD traveling by operating the front side clutch 40 and the coupling 54 to release the front side clutch 40 and the coupling 54 during 2WD traveling. In other words, the vehicle 10 is provided with the two disconnection mechanisms as disconnection mechanisms that stop the rotation of the predetermined rotating element by being operated during 2WD traveling. The predetermined rotating element is the rotating element that is pinched by the front side clutch 40 and the coupling 54 among the rotating elements which constitute the power transmission path between the engine 12 and the rear wheels 16. The rotating element that is pinched by the front side clutch 40 and the coupling 54 is each of the rotating elements that constitute the power transmission path from the second rotating member 38 to the differential case 32c. A driving state where the front side clutch 40 and the coupling 54 are released and the rotation of each of the rotating elements described above is stopped is a disconnect state where the rotation of the predetermined rotating element is stopped. The driving state where the front side clutch 40 and the coupling 54 are released and the rotation of each of the rotating elements described above is stopped is, in other words, a 2WD traveling state where the rotation in conjunction is prevented. The 2WD traveling in this disconnect state will be described as 2WD_d traveling. During the 2WD_d traveling, it may be impossible to completely stop the rotation of the predetermined rotating element, due to the drag of the multi-plate clutch 54c, even if the coupling 54 is in a released state. However, the disconnection mechanism is disposed so as to stop the rotation of the predetermined rotating element (that is, to aim to stop the rotation). To stop the rotation of the predetermined rotating element also includes, in result, a state where the rotation of the predetermined rotating element occurs to some extent.

In the vehicle 10, power is not transmitted to the rear wheels 16 if the front side clutch 40 is engaged and the coupling 54 is released. Alternatively, power is not transmitted to the rear wheels 16 if the front side clutch 40 is released and the coupling 54 is engaged. Accordingly, only the front wheels 14 are driven for 2WD traveling. During the 2WD traveling, the respective rotating elements that constitute the power transmission path from the second rotating member 38 to the differential case 32c rotate in conjunction. Accordingly, fuel efficiency decreases, by the amount of the rotation in conjunction of the propeller shaft 28 and the like, despite the 2WD traveling. However, when 2WD traveling is switched into 4WD traveling, prompt switching is allowed just by connecting the coupling 54. 2WD traveling in a connect state where only one of the front side clutch 40 and the coupling 54 is engaged will be described as 2WD_c traveling in some cases.

The vehicle 10 is switched between 2WD traveling and 4WD traveling as the disconnect state of the front side clutch 40 or the transmission torque of the coupling 54 is controlled in accordance with the traveling state of the vehicle 10.

The vehicle 10 is provided with an electronic control unit (ECU) 100 that includes a control device for the vehicle 10 which switches the operation states of the front side clutch 40 and the coupling 54 in accordance with, for example, the traveling state of the vehicle 10. The electronic control unit 100 is configured to include a so-called microcomputer that is provided with, for example, a CPU, a RAM, a ROM, an I/O interface, and the like. The CPU executes various types of control for the vehicle 10 by performing signal processing in accordance with a program stored in advance in the ROM while using a temporary storage function of the RAM. For example, the electronic control unit 100 executes output control for the engine 12, driving state switching control for the vehicle 10, and the like. The electronic control unit 100 is configured to be divided into those for engine control, driving state control, and the like as needed. As illustrated in FIG. 1, various actual values based on respective detection signals from various sensors provided in the vehicle 10 are supplied to the electronic control unit 100. Examples of the various sensors provided in the vehicle 10 include various rotation speed sensors 60, 62, 64, 66, 68, an accelerator opening sensor 70, a throttle valve opening sensor 72, a G sensor 74, a yaw rate sensor 76, a steering sensor 78, an outside air temperature sensor 80, a 4WD selection switch 82 as a 4WD selection device that is used to select transition to 4WD traveling based on a driver's operation, a shift position sensor 84, a paddle switch 86 as a manual transmission device that is used to shift the transmission 18 based on a driver's operation, a traveling mode selection switch 88 as a mode selection device that is used to select, based on a driver's operation, a predetermined snow mode in which the gear ratio γ of a high vehicle speed side (high side) of the transmission 18 is likely to be selected compared to a predetermined normal mode and a predetermined sport mode in which the gear ratio γ on a low vehicle speed side (low side) of the transmission 18 is likely to be selected compared to the predetermined normal mode, and an oil temperature sensor 90. Examples of the various actual values based on the detection signals include an engine rotation speed Ne, a transmission input rotation speed Nin, a transmission output rotation speed Nout, a propeller shaft rotation speed Np, respective vehicle wheel speeds Nwfl, Nwfr, Nwrl, Nwrr corresponding to rotation speeds (respective vehicle wheel speeds) Nw of respective vehicle wheels (that is, front wheels 14R, 14L and rear wheels 16R, 16L), accelerator opening θacc, a throttle valve opening θth, a longitudinal acceleration Gx of the vehicle 10, a lateral acceleration Gy of the vehicle 10, a yaw rate Ryaw that is a rotation angular velocity about a vertical axis of the vehicle 10, a steering angle θsw and a steering direction of a steering wheel, an outside air temperature THair, a 4WD request 4WDon that is a signal showing the operation of the 4WD selection switch 82 by the driver, a shift position Psh that is a shift lever operation position, a downshift request DNon and an upshift request UPon that are signals showing the operation of the paddle switch 86 by the driver, a snow mode ON SNOWon and a sport mode ON SPORTon that are signals showing the operation of the traveling mode selection switch 88 by the driver, and the temperature of a hydraulic oil that lubricates the rotating member in the second power transmission path, for example, a hydraulic oil temperature THoil in the rear differential 32. As illustrated in FIG. 1, an engine output control command signal Se for output control for the engine 12, an operation command signal Sd for switching the state of the front side clutch 40, an engagement force command signal Sc for controlling the engagement force of the coupling 54 (multi-plate clutch 54c), and the like are respectively output to engine control devices such as a fuel injection device, an ignition device, and a throttle actuator, the front side actuator 50, the electromagnetic solenoid (not illustrated) for driving the coupling 54, and the like from the electronic control unit 100. The electronic control unit 100 calculates a speed V of the vehicle 10 (hereinafter, referred to as a vehicle speed V) as one of various actual values based on the respective vehicle wheel speeds Nw. For example, the electronic control unit 100 may set the average vehicle wheel speed of the respective vehicle wheel speeds Nw as the vehicle speed V.

Figure 2:
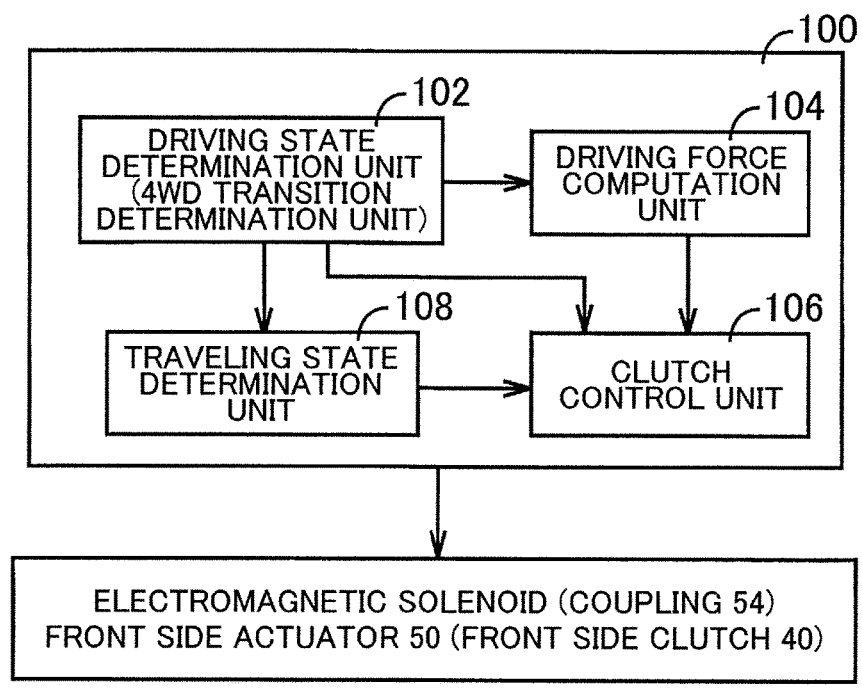
FIG. 2 is a functional block diagram showing a main part of a control function of an electronic control unit.

FIG. 2 is a functional block diagram showing a main part of a control function of the electronic control unit 100. According to FIG. 2, the electronic control unit 100 is provided with a driving state determination unit 102, a driving force computation unit 104, and a clutch control unit 106.

The driving state determination unit 102 determines an optimal driving state of the vehicle 10 based on information such as the various signals described above. Specifically, in a case where it is determined that the vehicle 10 is in a steady traveling state where a driving force change in the vehicle 10 is smaller than a driving force change threshold which is obtained and stored in a prior experiment or design (that is, pre-defined) based on the accelerator opening θacc, the vehicle speed V, and the like, the driving state determination unit 102 determines the driving state of the vehicle 10 to be the 2WD_d traveling in which the traveling is performed with both the front side clutch 40 and the coupling 54 released. In a case where it is determined that the driving force change in the vehicle 10 exceeds the driving force change threshold, the driving state determination unit 102 determines the driving state of the vehicle 10 to be the 4WD traveling in which the traveling is performed with the front side clutch 40 engaged and the coupling 54 engaged or slip-engaged. In addition, the driving state determination unit 102 determines whether or not the vehicle 10 is turning based on whether or not the respective absolute values of the steering angle θsw, the lateral acceleration Gy, and the yaw rate Ryaw are equal to or greater than respective turning determination thresholds θswth, Gyth, Ryawth which are pre-defined to determine that the vehicle is turning. In a case where it is determined that the vehicle 10 is not turning, the driving state determination unit 102 determines the driving state of the vehicle 10 to be the 2WD_d traveling. In addition, the driving state determination unit 102 determines, based on the respective vehicle wheel speeds Nw, whether or not a predetermined vehicle wheel speed difference as a 4WD determination threshold which is pre-defined to determine that it is desirable for the driving state of the vehicle 10 to be the 4WD traveling occurs between the respective vehicle wheels. In a case where it is determined that any one of rotation speed difference between the respective vehicle wheels exceeds the predetermined vehicle wheel speed difference, the driving state determination unit 102 determines the driving state of the vehicle 10 to be the 4WD traveling. In addition, the driving state determination unit 102 determines whether or not the vehicle 10 is being steered based on whether or not the absolute value of the steering angle θsw is equal to or greater than a predetermined steering angle θswth2. The predetermined steering angle θswth2 is a pre-defined steering determination threshold that is used to determine that the steering wheel is steered by the driver so as to turn the vehicle 10. In a case where it is determined that the vehicle 10 is being steered, the driving state determination unit 102 compares the actual yaw rate Ryaw to a target yaw rate Ryawtgt calculated based on the vehicle speed V, the steering angle θsw, and the like and determines whether or not any one of an understeer state and an oversteer state is occurring as a vehicle behavior. In a case where it is determined that any one of the understeer state and the oversteer state is occurring, the driving state determination unit 102 determines the driving state of the vehicle 10 to be the 4WD traveling. In addition, the driving state determination unit 102 determines whether the driving state of the vehicle 10 should be the 2WD traveling or the 4WD traveling based on the operation state of the 4WD selection switch 82. In a case where a 4WD request 4WDon signal input is present, the driving state determination unit 102 determines the driving state of the vehicle 10 to be the 4WD traveling. In this manner, the driving state determination unit 102 functions as a 4WD transition determination unit that determines whether or not to perform transition to 4WD traveling during the 2WD_d traveling. Hereinafter, if not particularly distinguished, the 4WD traveling includes the 2WD_c traveling in which the front side clutch 40 is engaged and the transmission torque of the coupling 54 is substantially zero.

The driving force computation unit 104 calculates an optimal front-rear wheel driving force distribution based on information such as the various signals described above. Specifically, the driving force computation unit 104 calculates an estimated value (estimated engine torque) Tep for an engine torque Te based on the engine rotation speed Ne, the throttle valve opening θth, and the like. The driving force computation unit 104 calculates the front-rear wheel driving force distribution to ensure the maximum acceleration performance. In a case where the driving state of the vehicle 10 is determined to be the 2WD_d traveling by the driving state determination unit 102, the driving force computation unit 104 turns the driving force distribution to the rear wheels 16 into zero. In addition, the driving force computation unit 104 reduces the driving force distribution to the rear wheels 16 in a case where it is determined that the driver's operation situation and the driving force change in the vehicle 10 are stable based on the throttle valve opening θth, the vehicle speed V, the respective vehicle wheel speeds Nw, and the like. Accordingly, a situation close to front wheel driving occurs and the fuel efficiency is improved. In addition, the driving force computation unit 104 reduces the driving force distribution to the rear wheels 16 so as to prevent a tight braking phenomenon during low-speed turning.

The clutch control unit 106 outputs respective command signals to the electromagnetic solenoid (not illustrated) for the driving state determined by the driving state determination unit 102 and the front-rear wheel driving force distribution calculated by the driving force computation unit 104. The electromagnetic solenoid (not illustrated) controls the front side actuator 50 that switches the disconnect state of the front side clutch 40 and the transmission torque of the coupling 54. Specifically, in a case where the driving state of the vehicle 10 is determined to be the 2WD_d traveling by the driving state determination unit 102, the clutch control unit 106 outputs commands for releasing the front side clutch 40 and turning the transmission torque of the coupling 54 into zero to the front side actuator 50 and the electromagnetic solenoid, respectively. In a case where the driving state of the vehicle 10 is determined to be the 4WD traveling by the driving state determination unit 102, the clutch control unit 106 outputs commands for connecting (engaging) the front side clutch 40 and controlling the transmission torque of the coupling 54 to the front side actuator 50 and the electromagnetic solenoid, respectively, for 4WD traveling in the front-rear wheel driving force distribution calculated by the driving force computation unit 104.

During a transition from 2WD_d traveling to 4WD traveling in particular, the clutch control unit 106 outputs a command for generating the transmission torque in the coupling 54 to the electromagnetic solenoid first and controls the electromagnetic solenoid so that the coupling 54 is engaged. This is to realize synchronization between the rotation speed of the first rotating member 36 and the rotation speed of the second rotating member 38 by increasing the rotation speed of the propeller shaft 28 whose rotation is substantially stopped for connection of the front side clutch 40. After a substantial synchronization between the rotation speed of the first rotating member 36 and the rotation speed of the second rotating member 38 is determined, the clutch control unit 106 outputs a command for connecting the front side clutch 40 to the front side actuator 50. Then, the clutch control unit 106 outputs the command for generating the transmission torque in the coupling 54 to the electromagnetic solenoid for the front-rear wheel driving force distribution calculated by the driving force computation unit 104. The clutch control unit 106 determines whether or not the rotation speed of the first rotating member 36 and the rotation speed of the second rotating member 38 are substantially synchronized with each other based on, for example, whether or not the absolute value of the rotation speed difference between the rotation speed of the first rotating member 36 and the rotation speed of the second rotating member 38 is equal to or less than a synchronization determination threshold $\Delta Nth$. The rotation speed of the first rotating member 36 and the rotation speed of the second rotating member 38 may be respective rotation speeds that are directly detected by rotation speed sensors (not illustrated) or may be respective rotation speeds that are converted from the transmission output rotation speed Nout and the propeller shaft rotation speed Np corresponding respectively thereto. The synchronization determination threshold $\Delta Nth$ is, for example, the maximum synchronizable rotation speed difference that is pre-defined as the maximum value of the rotation speed difference allowing the connection (engagement) of the front side clutch 40. A series of the above-described control procedure performed during the transition from 2WD_d traveling to 4WD traveling is a normal 4WD transition control procedure.

During the transition from the 2WD_d traveling to the 4WD traveling, time is required to fill, for example, a clutch pack of the multi-plate clutch 54c (hydraulic oil chamber of the clutch) with the hydraulic oil, so that the clutch plate of the multi-plate clutch 54c is in a state of abutting against a friction material of the multi-plate clutch 54c, until the rotation speed of the propeller shaft 28 whose rotation is substantially stopped due to the engagement of the coupling 54 is actually increased. Accordingly, there is room for improvement relating to improving the control responsiveness after a moment of determination for transition to 4WD traveling by the driving state determination unit 102 while suppressing fuel efficiency degradation by maintaining the 2WD_d traveling to the maximum extent possible. This embodiment proposes shortening of the time from the moment of determination for transition to 4WD traveling to the initiation of an increase in the propeller shaft rotation speed Np. Also proposed is control of the engagement force of the multi-plate clutch 54c in performing the shortening of the time. In other words, the electronic control unit 100 starts the execution of pre-charge control for the multi-plate clutch 54c even before the determination for transition from 2WD_dtraveling to 4WD traveling. The pre-charge control refers to, for example, filling the clutch pack of the multi-plate clutch 54c (hydraulic oil chamber of the clutch) with the hydraulic oil so that the clutch plate of the multi-plate clutch 54c is in a state of abutting against the friction material of the multi-plate clutch 54c. The pre-charge control refers to, for example, controlling the multi-plate clutch 54c so that a clearance between the clutch plate of the multi-plate clutch 54c and the friction material of the multi-plate clutch 54c is filled. In other words, the electronic control unit 100 initiates the pre-charge control by predicting the determination for transition to 4WD traveling.

The electronic control unit 100 is also provided with a traveling state determination unit 108 so as to realize the pre-charge control. The traveling state determination unit 108 determines whether or not the vehicle 10 is in a predetermined traveling state when the transition from 2WD_d traveling to 4WD traveling has yet to be determined by the driving state determination unit 102. The predetermined traveling state is, for example, a traveling state where a state where the transition from 2WD_d traveling to 4WD traveling is determined by the driving state determination unit 102 is predicted to occur. As described above, the state where the transition to 4WD traveling is determined is, for example, a state where the driving force change exceeds the driving force change threshold, a state where any one of the rotation speed differences between the respective vehicle wheels exceeds the predetermined vehicle wheel speed difference, a state where any one of the understeer state and the oversteer state occurs, and the like. Accordingly, during the 2WD traveling, the traveling state determination unit 108 determines that the vehicle 10 is in the predetermined traveling state when the driving force change is predicted to exceed the driving force change threshold, when the predetermined vehicle wheel speed difference is predicted to occur in any one of the rotation speed difference between the respective vehicle wheels (for example, between the front wheels 14 and the rear wheels 16), or when any one of the understeer state and the oversteer state is predicted to occur.

Hereinafter, each of the predictions described above will be described in detail. When the vehicle has a deceleration tendency regardless of a substantially constant accelerator opening θacc as in uphill road traveling or when the vehicle is traveling in the vicinity of an exit of a corner, the accelerator pedal may be increasingly depressed thereafter. Accordingly, it can be predicted that the driving force change exceeds the driving force change threshold. During traveling on a low μ road such as a snow-covered road and a frozen road, wheel slip may occur as a result of accelerator ON. Accordingly, it can be predicted that the predetermined vehicle wheel speed difference occurs in any one of the rotation speed difference between the respective vehicle wheels. During traveling on a low μ road in the presence of a deceleration tendency as in uphill road traveling, accelerator ON is likely to occur thereafter and wheel slip may occur. Accordingly, it can be predicted that the predetermined vehicle wheel speed difference occurs in any one of the rotation speed difference between the respective vehicle wheels. During traveling on a low μ road and a winding road, the actual yaw rate Ryaw may deviate from the target yaw rate Ryawtgt. Accordingly, it can be predicted that any one of the understeer state and the oversteer state occurs.

Accordingly, the traveling state determination unit 108 predicts whether or not the driving force change exceeds the driving force change threshold, predicts whether or not the predetermined vehicle wheel speed difference occurs in any one of the rotation speed difference between the respective vehicle wheels, or predicts whether or not any one of the understeer state and the oversteer state occurs based on at least one of the states of the low μ road, the uphill road, and the steering.

The traveling state determination unit 108 determines whether or not the traveling road is a predetermined low μ road based on the outside air temperature THair and the like. In addition, the traveling state determination unit 108 determines whether or not the traveling road is a predetermined uphill road based on a comparison between a reference acceleration with respect to the accelerator opening θacc and the actual longitudinal acceleration Gx and the like. Alternatively, the traveling state determination unit 108 determines whether or not the traveling road is a predetermined uphill road based on gradient information from a gradient sensor (not illustrated). In addition, the traveling state determination unit 108 determines the state of steering based on at least one of the longitudinal acceleration Gx, the lateral acceleration Gy, the yaw rate Ryaw, and the steering angle θsw. In addition, the traveling state determination unit 108 may determine an uphill road, the vicinity of an exit of a corner, a winding road, and the like based on information from a navigation system (not illustrated) or the like.

In a case where it is determined by the traveling state determination unit 108 that the vehicle 10 is in the predetermined traveling state, the clutch control unit 106 controls the engagement force of the coupling 54 to be an engagement force for maintaining the rotation speed of the propeller shaft 28 in a state prior to the initiation of a continuous increase in the propeller shaft rotation speed Np. The state prior to the initiation of a continuous increase in the propeller shaft rotation speed Np is a state immediately before the initiation of a continuous increase in the propeller shaft rotation speed Np. For example, this state is a rotation stop state of the propeller shaft 28 where the propeller shaft 28 is to start to rotate as the engagement force of the coupling 54 is slightly increased. Alternatively, this state is a state where the propeller shaft 28 slightly rotates so that the propeller shaft rotation speed Np starts to increase as the engagement force of the coupling 54 is slightly increased. In other words, this state is a state where the rotation of the propeller shaft 28 is substantially stopped.

Hereinafter, how the engagement force of the coupling 54 is controlled will be described. An engagement force command value at the initiation of the control of the engagement force of the coupling 54 is, for example, a pre-defined and predetermined initial engagement force command value that is an engagement force of the coupling 54 at which an increase in the propeller shaft rotation speed Np is not ensured to start. As the temperature of the hydraulic oil in the second power transmission path decreases, the drag torque of the rotating member whose rotation speed is increased as a result of the engagement of the coupling 54 (for example, the respective rotating elements that constitute the power transmission path from the second rotating member 38 to the differential case 32c) increases. Accordingly, the propeller shaft rotation speed Np is unlikely to increase. Accordingly, the clutch control unit 106 changes the engagement force at the initiation of the control of the engagement force of the coupling 54 (that is, the predetermined initial engagement force command value) based on, for example, the temperature of the hydraulic oil which lubricates the rotating member whose rotation speed is increased as a result of the engagement of the coupling 54 during the transition from 2WD traveling to 4WD traveling (for example, hydraulic oil temperature THoil in the rear differential 32). The amount of change in the engagement force is pre-defined with respect to at least the hydraulic oil temperature THoil.

The clutch control unit 106 increases the engagement force command value in controlling the engagement force of the coupling 54 continuously or in stages and, after the initiation of the increase in the propeller shaft rotation speed Np, holds an engagement force command value, a first value, that is a predetermined value lower than the engagement force command value at the initiation of the increase in the propeller shaft rotation speed Np. For example, during the control of the engagement force of the coupling 54, the clutch control unit 106 increases the engagement force command value by a constant value from a predetermined initial engagement force command value until the increase in the propeller shaft rotation speed Np is initiated every time a predetermined period of time elapses from the initiation of the control. Alternatively, during the control of the engagement force of the coupling 54, the clutch control unit 106 increases the engagement force command value with a constant gradient from a predetermined initial engagement force command value until the increase in the propeller shaft rotation speed Np is initiated from the initiation of the control. Then, the clutch control unit 106 reduces the engagement force command value by a predetermined value and maintains the value after the initiation of the increase in the propeller shaft rotation speed Np. The clutch control unit 106 determines whether or not the increase in the propeller shaft rotation speed Np is initiated based on, for example, whether or not the propeller shaft rotation speed Np is greater than a predetermined rotation speed N1 (pre-defined rotation initiation determination threshold) which is slightly greater than zero rotation. The predetermined period of time described above is, for example, a pre-defined period of time for the actual engagement force to be stabilized to be substantially constant with respect to the engagement force command value. The constant value described above is, for example, a pre-defined value for the held engagement force command value not to significantly deviate with respect to the engagement force at the boundary of the initiation of the increase in the propeller shaft rotation speed Np. The constant gradient described above is, for example, the rate of change in the engagement force command value at a time of the change by the predetermined value at the predetermined period of time. The predetermined value described above is, for example, the constant value by one stage or a plurality of stages in a case where the engagement force command value is increased in stages. In a case where the predetermined value is the constant value by the one or the plurality of stages, the engagement force command value returns to the previous or multiple times previous engagement force command value. The predetermined value described above is, for example, the engagement force command value increased in one cycle or several cycles in the control cycle (refer to FIG. 3A and FIG. 3B) in a case where the engagement force command value is continuously increased. In a case where the engagement force command value is increased in stages, the time may be different, for example, for the first time and the second time instead of every time the predetermined period of time elapses. In a case where the engagement force command value is increased in stages, for example, the value increased for the first time and the second time may be different instead of being increased by the constant value.

The clutch control unit 106 uses the engagement force command value, the first value, that is lower by the predetermined value than the engagement force command value at the initiation of the increase in the propeller shaft rotation speed Np as an engagement force command value at the initiation of the subsequent control of the engagement force of the coupling 54. In other words, the predetermined initial engagement force command value is updated to an engagement force command value at the initiation of the subsequent control.

In a case where the transition to 4WD traveling is determined by the driving state determination unit 102 when the engagement force of the coupling 54 is controlled in a state prior to the initiation of the increase in the propeller shaft rotation speed Np, the clutch control unit 106 increases the engagement force command value in controlling the engagement force of the coupling 54 so that the coupling 54 is engaged. In this manner, the propeller shaft rotation speed Np is promptly increased and the front side clutch 40 is promptly engaged after the moment of determination for transition to 4WD traveling.

Figure 3A:
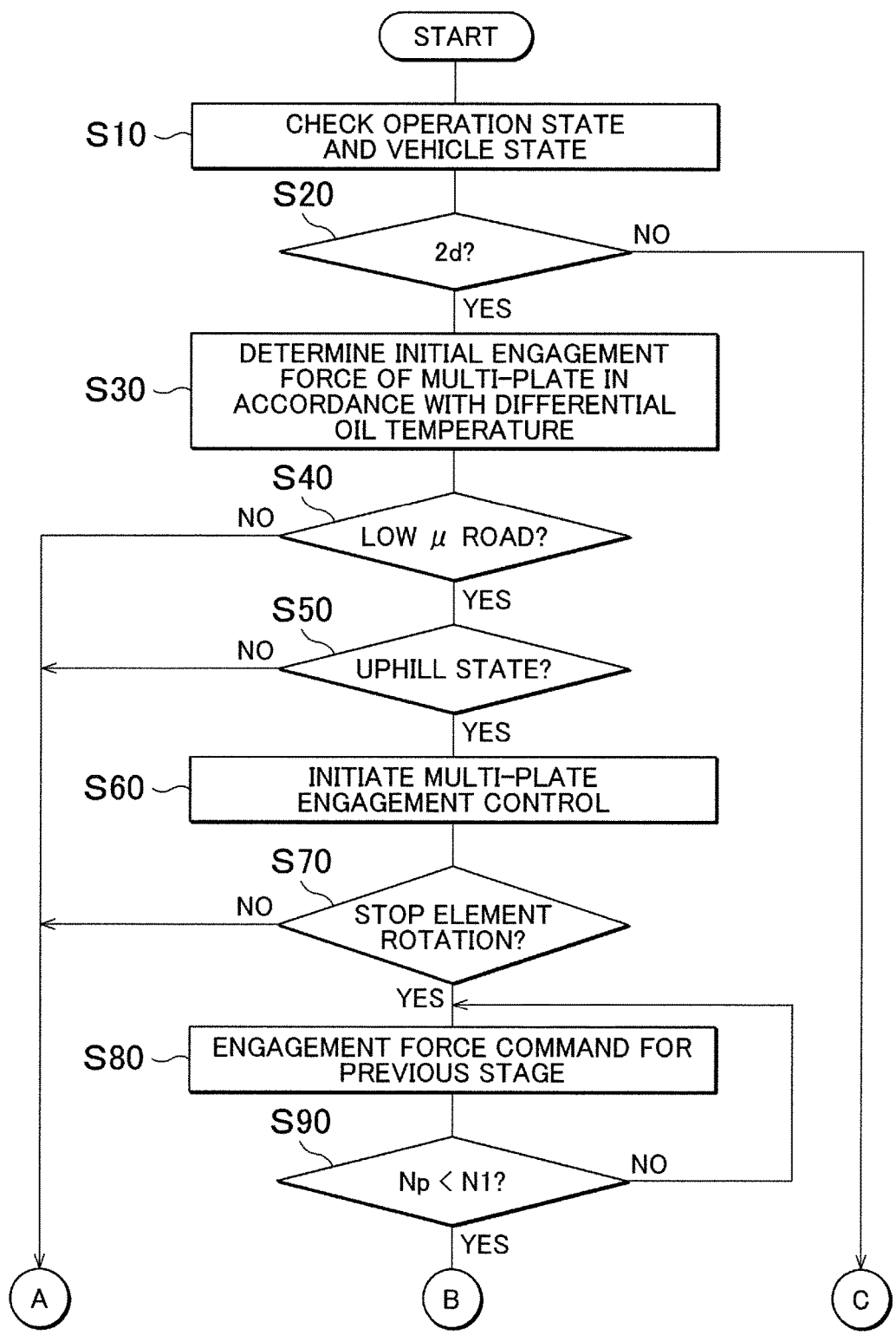
FIG. 3A is a flowchart showing a main part of a control operation by the electronic control unit, that is, a control operation for improving the responsiveness of control for transition to 4WD traveling that is executed after a moment of determination for transition to 4WD traveling.
Figure 3B:
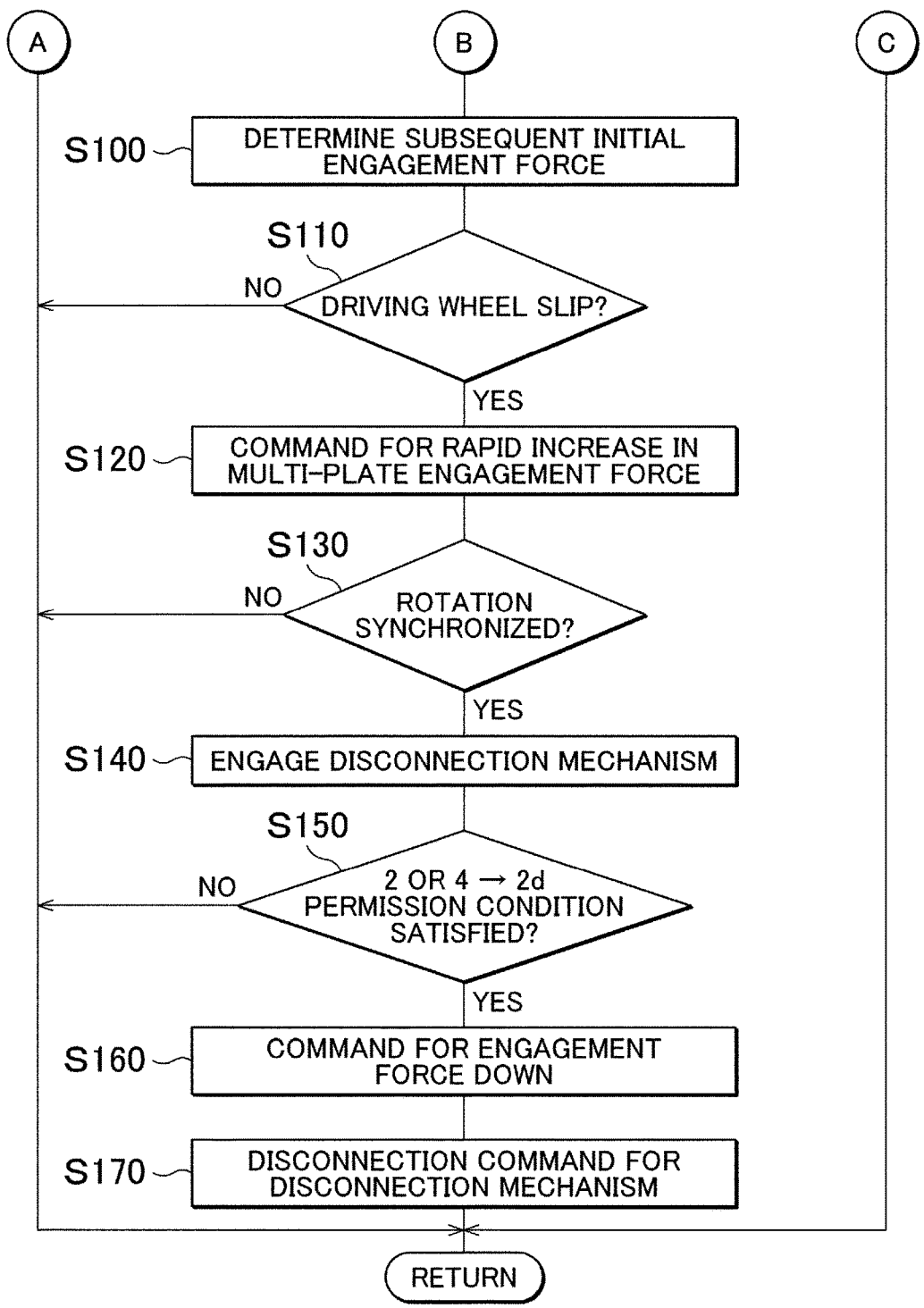
FIG. 3B is a continuation of the flowchart showing a main part of a control operation by the electronic control unit, that is, a control operation for improving the responsiveness of control for transition to 4WD traveling that is executed after a moment of determination for transition to 4WD traveling.
Figure 4:
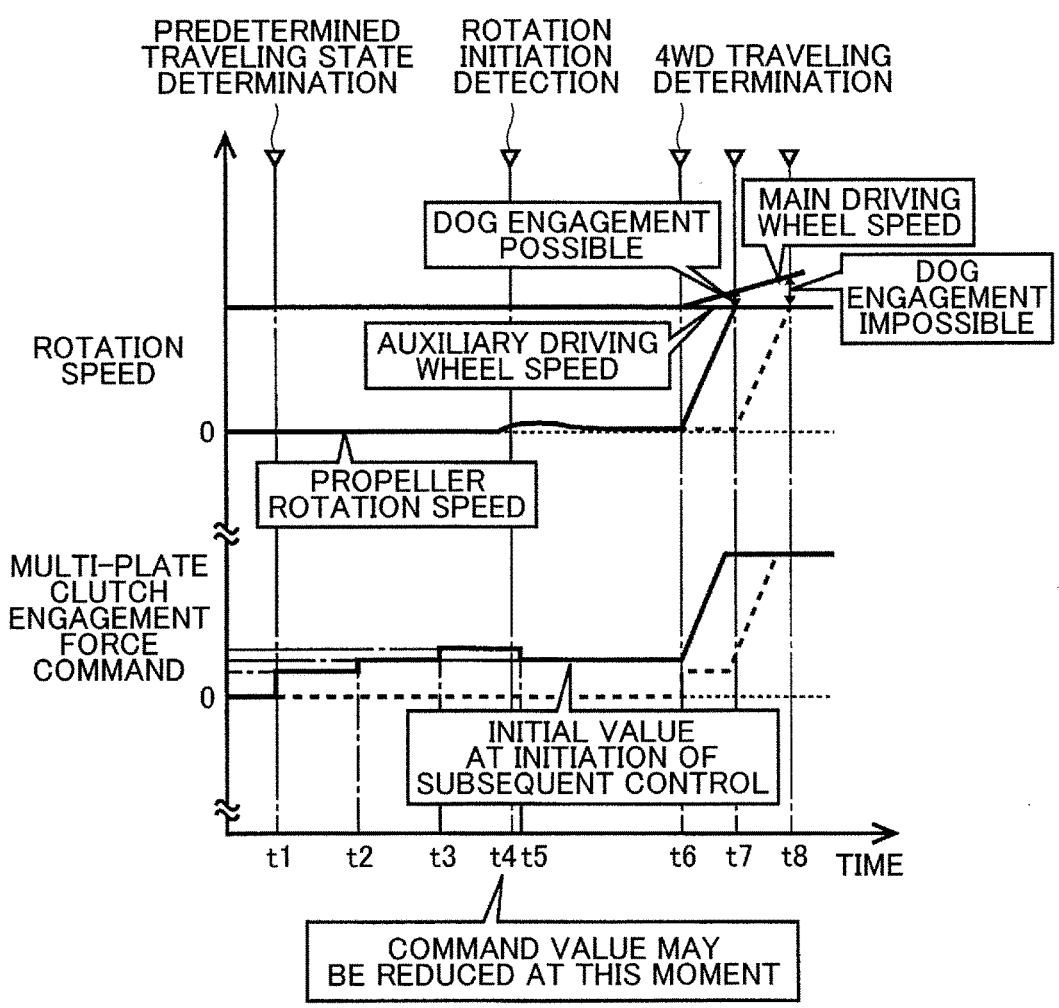
FIG. 4 is an example of a time chart for a case where the control operation that is illustrated in the flowcharts in FIG. 3A

FIG. 3A and FIG. 3B are flowcharts showing a main part of a control operation by the electronic control unit 100, that is, a control operation for improving the responsiveness of control for transition to 4WD traveling that is executed after a moment of determination for transition to 4WD traveling. The flowchart is repeatedly executed in an extremely short cycle time of, for example, approximately several msec to dozens of msec. FIG. 4 is an example of a time chart for a case where the control operation that is illustrated in the flowcharts in FIG. 3A and FIG. 3B is executed.

According to FIG. 3A and FIG. 3B, an operation state and a vehicle state are acquired first based on, for example, the various actual values based on the detection signals from the various sensors in Step (hereinafter, Step will be omitted) S10 corresponding to the driving state determination unit 102. Then, in S20 corresponding to the driving state determination unit 102, it is determined, for example, whether or not the 2WD_d traveling is being performed. This routine is terminated in a case where the determination in S20 is negative. In a case where the determination in S20 is positive, the initial engagement force command value at the initiation of the control of the engagement force of the coupling 54 is determined in S30 corresponding to the clutch control unit 106 based on, for example, the hydraulic oil temperature THoil in the rear differential 32. Then, in S40 corresponding to the traveling state determination unit 108, it is determined, for example, whether or not the traveling road is a low μ road. This routine is terminated in a case where the determination in S40 is negative. In a case where the determination in S40 is positive, it is determined, for example, whether or not the traveling road is an uphill road in S50 corresponding to the traveling state determination unit 108. This routine is terminated in a case where the determination in S50 is negative. In a case where the determination in S50 is positive, the engagement control for controlling, for example, the engagement force of the coupling 54 is initiated in S60 corresponding to the clutch control unit 106 (t1 moment in FIG. 4). Then, in S70 corresponding to the clutch control unit 106, it is determined, for example, whether or not the increase in the propeller shaft rotation speed Np is initiated (after t1 moment in FIG. 4). This routine is terminated in a case where the determination in S70 is negative. In a case where the determination in S70 is positive (t4 moment in FIG. 4), the engagement force command value in controlling the engagement force of the coupling 54 becomes, for example, an engagement force command value one stage prior to the current engagement force command value (engagement force command value lower by a predetermined value) in S80 corresponding to the clutch control unit 106 (t5 moment in FIG. 4). Then, in S90 corresponding to the clutch control unit 106, it is determined, for example, whether or not the propeller shaft rotation speed Np is less than the predetermined rotation speed N1. The processing returns to S80 described above in a case where the determination in S90 is negative. In a case where the determination in S90 is positive, the engagement force command value that is output in, for example, S80 described above becomes the engagement force command value at the initiation of the subsequent control of the engagement force in S100 corresponding to the clutch control unit 106. Then, in S110 corresponding to the driving state determination unit 102, it is determined, for example, whether or not a condition for transition of the driving state of the vehicle 10 to 4WD traveling is satisfied (for example, whether or not any one of the rotation speed differences between the respective vehicle wheels exceeds a predetermined vehicle wheel speed difference). This routine is terminated in a case where the determination in S110 is negative. In a case where the determination in S110 is positive, the engagement force command value in controlling the engagement force of the coupling 54 is, for example, rapidly increased, so that the coupling 54 is engaged, in S120 corresponding to the clutch control unit 106 (after t6 moment in FIG. 4). Then, in S130 corresponding to the clutch control unit 106, it is determined, for example, whether or not the rotation speed of the first rotating member 36 and the rotation speed of the second rotating member 38 are synchronized (after t6 moment in FIG. 4). This routine is terminated in a case where the determination in S130 is negative. In a case where the determination in S130 is positive, a command for engaging the front side clutch 40, for example, is output to the front side actuator 50 in S140 corresponding to the clutch control unit 106 (after t7 moment in FIG. 4). Then, in S150 corresponding to the driving state determination unit 102, it is determined, for example, whether or not a permission condition for transition of the driving state of the vehicle 10 from 4WD traveling to 2WD_d traveling is satisfied. Examples of whether or not the permission condition for transition of the driving state of the vehicle 10 from 4WD traveling to 2WD_d traveling is satisfied include whether or not the driving force change in the vehicle 10 is smaller than the driving force change threshold and any one of the rotation speed differences between the respective vehicle wheels is within a predetermined vehicle wheel speed difference. This routine is terminated in a case where the determination in S150 is negative. In a case where the determination in S150 is positive, the engagement force command value of the coupling 54 is, for example, reduced in S160 corresponding to the clutch control unit 106 so that the coupling 54 is released. Then, in S170 corresponding to the clutch control unit 106, a command for releasing the front side clutch 40 is, for example, output to the front side actuator 50.

According to FIG. 4, t1 moment shows that the vehicle is determined to be in a predetermined traveling state where the determination for transition to 4WD traveling is predicted during 2WD_d traveling. Starting from t1 moment, the engagement force command value of the coupling 54 is increased by a constant value with respect to the initial value at the initiation of the control every time a predetermined period of time elapses (refer to t2 moment and t3 moment). At t4 moment, the rotation of the propeller shaft rotation speed Np is initiated, and thus the engagement force command value of the coupling 54 is decreased by a predetermined value at t5 moment a predetermined period of time after t3 moment. This value is maintained until t6 moment when the transition to 4WD is determined and becomes the initial value at the initiation of the subsequent control of the coupling 54. Immediately after the transition to 4WD is determined at t6 moment, the engagement force command value of the coupling 54 is controlled so that the coupling 54 is engaged and the propeller shaft rotation speed Np is increased immediately. In contrast, in a comparative example (refer to the dashed line) in which this control (pre-charge control for the multi-plate clutch 54c, refer to the solid line) is not executed, filling of the clutch pack with the hydraulic oil for a state where the clutch plate of the multi-plate clutch 54c abuts against the friction material of the multi-plate clutch 54c is executed after the transition to 4WD is determined at t6 moment, and the propeller shaft rotation speed Np is increased after t7 moment. Accordingly, in the comparative example, the initiation of the increase in the propeller shaft rotation speed Np is delayed. Accordingly, a slip in the front wheels 14 expands a differential rotation between the front wheels 14 and the rear wheels 16, and the front side clutch 40 may be incapable of being engaged (refer to t8 moment). During this control, meanwhile, the propeller shaft rotation speed Np is increased before the expansion of the differential rotation between the front wheels 14 and the rear wheels 16. Accordingly, the front side clutch 40 can be engaged (refer to t7 moment). In the embodiment illustrated in FIG. 4, the engagement force command value of the coupling 54 is reduced by a predetermined value at t5 moment. For example, the engagement force command value of the coupling 54 may be reduced by a predetermined value at t4 moment when the initiation of the rotation of the propeller shaft rotation speed Np is detected.

According to this embodiment, the engagement force of the coupling 54 can be controlled for a state immediately prior to the initiation of a continuous increase in the propeller shaft rotation speed Np as described above when the transition to 4WD traveling has yet to be determined and the vehicle 10 is in a predetermined traveling state. Accordingly, the responsiveness of the control of the engagement force of the coupling 54 for the initiation of a continuous increase in the propeller shaft rotation speed Np can be improved. From another point of view, the initiation of the control of the engagement force of the coupling 54 is not at the moment when the transition to 4WD traveling is determined (4WD function essential moment). Accordingly, the propeller shaft rotation speed Np can be in a state immediately prior to the initiation of the continuous increase in the propeller shaft rotation speed Np with a margin. Accordingly, the responsiveness of the control for transition to 4WD traveling that is executed after the moment of determination for transition to 4WD traveling can be improved. In addition, the control of the engagement force (torque variation reduction) at the initial period of engagement when the transmission torque starts to be generated in the coupling 54 is possible.

In addition, according to this embodiment, the clutch control unit 106 changes the engagement force at the initiation of the control of the engagement force of the coupling 54 based on the hydraulic oil temperature THoil during the transition from 2WD traveling to 4WD traveling. Accordingly, in a general temperature range, the drag torque of the rotating member constituting the second power transmission path increases when the hydraulic oil temperature THoil is low. A significant engagement force is required to maintain the propeller shaft 28 in a state prior to the initiation of a continuous increase in the propeller shaft rotation speed Np. With respect to this, an appropriate engagement force can be achieved. In addition, in a case where the hydraulic oil temperature THoil is high, the engagement force of the coupling 54 may be a smaller engagement force than in a case where the hydraulic oil temperature THoil is low. Accordingly, excessive energy consumption for generating a more-than-necessary engagement force in the coupling 54 can be suppressed.

In addition, according to this embodiment, the clutch control unit 106 increases the engagement force in controlling the engagement force of the coupling 54 continuously or in stages, and holds an engagement force that is lower by a predetermined value than the engagement force at the initiation of the increase in the propeller shaft rotation speed Np after the initiation of the increase in the propeller shaft rotation speed Np. Accordingly, the propeller shaft 28 can be appropriately maintained in a state prior to the initiation of the continuous increase in the propeller shaft rotation speed Np.

In addition, according to this embodiment, the clutch control unit 106 allows the engagement force that is lower by the predetermined value to become the engagement force at the initiation of the subsequent control of the engagement force of the coupling 54. Accordingly, the propeller shaft 28 is promptly maintained in a state prior to the initiation of the continuous increase in the propeller shaft rotation speed Np.

In addition, according to this embodiment, the traveling state determination unit 108 determines that the vehicle 10 is in the predetermined traveling state when a predetermined vehicle wheel speed difference is predicted to occur between the front wheels 14 and the rear wheels 16 or when any one of the understeer state or the oversteer state is predicted to occur during 2WD traveling. Accordingly, in the traveling state where the transition to 4WD traveling is likely to be determined, the engagement force in controlling the engagement force of the coupling 54 can be controlled to be the engagement force for maintaining the propeller shaft 28 in a state prior to the initiation of the continuous increase in the propeller shaft rotation speed Np.

In addition, according to this embodiment, the traveling state determination unit 108 predicts whether or not the predetermined vehicle wheel speed difference occurs or predicts whether or not any one of the understeer state and the oversteer state occurs based on at least one of the states of the low μ road, the uphill road, and the steering. Accordingly, the occurrence of the predetermined vehicle wheel speed difference or the occurrence of any one of the understeer state and the oversteer state can be appropriately predicted.

In addition, according to this embodiment, the clutch control unit 106 increases the engagement force in controlling the engagement force of the coupling 54 so that the coupling 54 is engaged in a case where the transition to 4WD traveling is determined by the driving state determination unit (4WD transition determination unit) 102. Accordingly, the propeller shaft rotation speed Np is promptly and continuously increased by controlling the engagement force of the coupling 54 from the moment of determination for transition to 4WD traveling.

Next, another embodiment of the invention will be described. In the following description, the same reference numerals will be used to refer to parts common to the embodiments and description thereof will be omitted.

In the first embodiment described above, the electronic control unit 100 initiates the pre-charge control for the multi-plate clutch 54c by predicting the determination of the transition to 4WD traveling. The second embodiment is not different from the first embodiment in that the execution of the pre-charge control for the multi-plate clutch 54c is started even before the determination for transition from 2WD_d traveling to 4WD traveling. However, the electronic control unit 100 initiates the pre-charge control when the operation is performed by the driver considering that the 4WD traveling is preferable and shift of the transmission 18 is determined by the operation instead of or in addition to the initiation of the pre-charge control based on the prediction of the determination of the transition to 4WD traveling. This is a technical idea for misleading a transition shock into a shift shock by executing the transition to 4WD traveling in accordance with the shift execution after the shift determination for the transmission 18. In addition, this is a technical idea for executing the pre-charge control in a period from the shift determination to the actual shift execution by executing the transition to 4WD traveling in accordance with the shift execution after the shift determination for the transmission 18.

When the operation is performed by the driver considering that the 4WD traveling is preferable and shift of the transmission 18 is determined by the operation is, for example, when the paddle switch 86 is operated by the driver and the downshift request DNon or the upshift request UPon is input to the electronic control unit 100. When the paddle switch 86 is operated, the driver is considered to aim for sporty traveling. Accordingly, 4WD traveling is considered to be preferable. In addition, it is highly likely that the shift of the transmission 18 is determined by the operation of the paddle switch 86. Accordingly, the transition to 4WD traveling is determined in accordance with the execution of the shift.

In addition, when the operation is performed by the driver considering that the 4WD traveling is preferable and shift of the transmission 18 is determined by the operation is, for example, when the traveling mode selection switch 88 is operated by the driver and the snow mode ON SNOWon or the sport mode ON SPORTon is input to the electronic control unit 100. It is considered that the 4WD traveling is preferable when the traveling mode selection switch 88 is operated for the selection of the snow mode. In addition, the upshift of the transmission 18 may be determined based on the selection of the snow mode during traveling at a certain gear ratio (gear stage). Accordingly, the transition to 4WD traveling is determined in accordance with the execution of the shift. When the traveling mode selection switch 88 is operated for the selection of the sport mode, the driver is considered to aim for sporty traveling. Accordingly, 4WD traveling is considered to be preferable. In addition, the downshift of the transmission 18 may be determined based on the selection of the sport mode during traveling at a certain gear ratio (gear stage). Accordingly, the transition to 4WD traveling is determined in accordance with the execution of the shift.

Accordingly, when the paddle switch 86 is operated by the driver during 2WD traveling, the traveling state determination unit 108 determines that the vehicle 10 is in the predetermined traveling state. Alternatively, when the traveling mode selection switch 88 is operated by the driver and the snow mode or the sport mode is selected during 2WD traveling, the traveling state determination unit 108 determines that the vehicle 10 is in the predetermined traveling state. In a case where the operation is performed by the driver and it is determined by the traveling state determination unit 108 that the vehicle 10 is in the predetermined traveling state during 2WD traveling, the driving state determination unit 102 determines whether or not to perform transition to 4WD traveling by determining whether or not the shift of the transmission 18 is initiated. In a case where it is determined by the driving state determination unit 102 that the shift of the transmission 18 is initiated and the transition to 4WD traveling is determined, the clutch control unit 106 increases the engagement force command value in controlling the engagement force of the coupling 54 so that the coupling 54 is engaged.

In this embodiment, the traveling state determination unit 108 determines whether or not the vehicle 10 is in the predetermined traveling state, based on whether or not the operation is performed by the driver, in Steps corresponding to S40 and S50 in the flowchart that is illustrated in FIG. 3A for the first embodiment described above. In addition, the driving state determination unit 102 determines whether or not to perform transition to 4WD traveling by determining whether or not the shift of the transmission 18 is initiated in Step corresponding to S110 in the flowchart that is illustrated in FIG. 3B.

As described above, effects similar to those of the first embodiment can be achieved by this embodiment. In addition, in the traveling state where the shift of the transmission 18 is likely to be executed and transition to 4WD traveling is preferable, the engagement force in controlling the engagement force of the coupling 54 can be controlled to be the engagement force for maintaining the propeller shaft 28 in a state prior to the initiation of the continuous increase in the propeller shaft rotation speed Np. In addition, the propeller shaft rotation speed Np can be promptly and continuously increased by controlling the engagement force of the coupling 54 from a moment of determination for transition to 4WD traveling. In addition, control for transition to 4WD traveling can be executed so that the shift control and the control for transition to 4WD traveling are misled into the shift shock for the transmission 18. In this case, the propeller shaft rotation speed Np is promptly and continuously increased as described above, and thus a shift control delay is suppressed.

The embodiments of the invention have been described in detail with reference to the accompanying drawings. The invention, however, is also applied to other aspects.

For example, the coupling 54 is disposed between the rear differential 32 and the rear wheel axle 34L on the left side in the embodiments described above. However, the invention is not limited thereto. For example, the coupling 54 may be disposed between the propeller shaft 28 and the drive pinion 30. The coupling 54 may be disposed between the ring gear 32r and the differential case 32c. The coupling 54 may be disposed between the ring gear 32r and each of the right and left rear wheel axles 34R, 34L. In the aspect in which the couplings 54 are disposed between the ring gear 32r and the right and left rear wheel axles 34R, 34L each as described above, the differential case 32c and the differential mechanism 32d are not essential. In addition, an additional disconnection mechanism (for example, a dog clutch) may also be disposed as a disconnection mechanism between the ring gear 32r and the rear wheel axles 34. In the vehicle 10 that is not provided with the additional disconnection mechanism (dog clutch herein), it may be impossible to completely stop the rotation of the predetermined rotating element described above (for example, the propeller shaft 28 or the like) during 2WD traveling as the drag of the multi-plate clutch 54c occurs even in a state where the coupling 54 is released. The disconnection mechanism may be a mechanism for stopping the rotation of a predetermined rotating element. However, the disconnection mechanism also includes a mechanism for a state where rotation occurs to some extent due to the drag described above or the like. Providing the additional disconnection mechanism (dog clutch herein) is useful in that the rotation attributable to the drag or the like can be prevented.

In the embodiments described above, the coupling 54 is an electronically-controlled coupling. However, the invention is not limited thereto. For example, the coupling 54 may be a synchro mechanism-attached dog clutch. In a case where the synchro mechanism-attached dog clutch is adopted, the engagement force is controlled, by controlling a friction engagement force of the synchro mechanism, to be an engagement force for maintaining the propeller shaft 28 in a state prior to the initiation of the continuous increase in the propeller shaft rotation speed Np. In the embodiments described above, the front side clutch 40 may be provided with a synchro mechanism. In this case, the engagement of the front side clutch 40 can be initiated from the moment of determination for transition to 4WD traveling. In this case, an aspect may be adopted for not controlling the coupling 54 already in a packed state toward engagement. If needed after the completion of the engagement of the front side clutch 40 and in 2WD_c traveling, a transition to 4WD traveling can be prompt by performing torque control on the coupling 54 already in the packed state.

In the embodiments described above, the front side clutch 40 is an electromagnetic dog clutch. However, the invention is not limited thereto. For example, the front side clutch 40 is provided with a shift fork that axially moves the sleeve. The front side clutch 40 may be a dog clutch whose shift fork is driven by an actuator that can be electrically controlled or hydraulically controlled. In addition, the front side clutch 40 is not limited to the dog clutch as in the embodiments described above. The front side clutch 40 can be appropriately applied insofar as the front side clutch 40 is configured to disconnect the rotating elements from each other.

In the embodiments described above, the vehicle 10 is structured so that power is transmitted to the front wheels 14 all the time and the rear wheels 16 are auxiliary driving wheels. However, the invention is not limited thereto. For example, the vehicle 10 may be structured so that power is transmitted to the rear wheels 16 all the time and the front wheels 14 are auxiliary driving wheels. For example, the vehicle 10 may be a FR-based 4WD vehicle.

In the flowchart in FIG. 3 according to the embodiment described above, the control of the engagement force of the coupling 54 is initiated in S60 on condition that both S40 and S50 are positive. However, the invention is not limited thereto. For example, S60 may be executed on condition that at least any one of S40 and S50 is positive. In addition, in order to prepare the transition to 4WD traveling, the engagement force of the coupling 54 may be controlled to be the engagement force for maintaining the propeller shaft 28 in a state prior to the initiation of a continuous increase in the propeller shaft rotation speed Np. Regardless of whether or not the vehicle 10 is in the predetermined traveling state, the control of the engagement force may be executed all the time during 2WD_d traveling. Accordingly, S40 and S50 may be omitted. In addition, in the control operation that is repeatedly executed, S30 may not be executed during the control of the engagement force of the coupling 54 initiated in S60. S60 is also in the control of the engagement force. Accordingly, S60 may be at multi-plate engagement control initiation or in the control with S30 incorporated into S60. In this manner, the aspect of the execution of the respective Steps in the flowchart in FIG. 3 can be appropriately changed within a permissible range.

In the embodiments described above, the paddle switch 86 has been described as an example of the manual transmission device. However, the invention is not limited thereto. For example, the manual transmission device may be a shift operation device that is provided with a shift position for manual shift mode selection and respective shift positions for upshift and downshift selection in the manual shift mode as shift lever operation positions.

In the embodiments described above, various automatic transmissions such as a planetary gear-type multi-speed transmission, a continuously variable transmission, and a synchromesh-type parallel two-shaft transmission (including a known DCT) have been described as examples of the transmission 18. However, the invention is not limited thereto. For example, the transmission 18 may be a known manual transmission or the transmission 18 is inessential insofar as the aspect of performing the control for transition to 4WD traveling is not executed in accordance with the shift of the transmission 18 as in the second embodiment described above.

In the embodiments described above, the vehicle 10 is provided with the paddle switch 86 (manual transmission device) and the traveling mode selection switch 88. However, the invention is not limited thereto. For example, at least any one of the paddle switch 86 (manual transmission device) and the traveling mode selection switch 88 may be provided insofar as the aspect of performing the control for transition to 4WD traveling is executed based on the driver's operation as in the second embodiment described above. In addition, the switches are inessential if the aspect of performing the control for transition to 4WD traveling based on the driver's operation is not executed.

In the embodiments described above, a gasoline engine or the like that is an internal combustion engine which generates power by fuel combustion has been described as an example of the driving force source. For example, another motor such as an electric motor can also be adopted alone or in combination with the engine.

The above description is embodiments in any aspect and various modifications and improvements can be added to the invention based on the knowledge of those skilled in the art.

What is claimed is:

1. A control device for a 4WD vehicle, the 4WD vehicle including a driving force source, main driving wheels, auxiliary driving wheels, a driving force transmission shaft, a first disconnection mechanism, and a second disconnection mechanism, the driving force transmission shaft configured to transmit part of power of the driving force source transmitted to the main driving wheels to the auxiliary driving wheels during 4WD traveling, the first disconnection mechanism disposed on the driving force source side of the driving force transmission shaft, the second disconnection mechanism disposed on the auxiliary driving wheels side of the driving force transmission shaft, the first disconnection mechanism and the second disconnection mechanism being configured to disconnect a power transmission path between the driving force source and the auxiliary driving wheels, the 4WD traveling being traveling with the first disconnection mechanism and the second disconnection mechanism being engaged, one of the first disconnection mechanism and the second disconnection mechanism being a clutch, the clutch having a first rotating member and a second rotating member configured to rotate relative to the first rotating member, and the clutch being configured to control an engagement force while synchronizing a rotation speed of the first rotating member and a rotation speed of the second rotating member, the control device comprising:
an electronic control unit configured to:
execute engagement control for controlling the engagement force of the clutch such that the driving force transmission shaft is maintained in a state prior to an initiation of a continuous increase in the rotation speed of the driving force transmission shaft, and
control the engagement force of the clutch based on a temperature of a hydraulic oil at the initiation of the engagement control, the hydraulic oil lubricates at least the first rotating member or the second rotating member, and the clutch is configured to cause an increase of the rotation speed of the first rotating member or the rotation speed of the second rotating member as a result of the engagement of the clutch.

2. The control device according to claim 1, wherein the electronic control unit is configured to:
increase the engagement force in executing the engagement control continuously or in stages; and
hold the engagement force at a first value after the initiation of the increase in the rotation speed of the driving force transmission shaft, the first value is lower by a predetermined value than a value of the engagement force at the initiation of the increase in the rotation speed of the driving force transmission shaft.

3. The control device according to claim 2, wherein the electronic control unit is configured to control the engagement force at the first value at an initiation of a subsequent engagement control.

4. A control device for a 4WD vehicle, the 4WD vehicle including a driving force source, main driving wheels, auxiliary driving wheels, a driving force transmission shaft, a first disconnection mechanism, and a second disconnection mechanism, the driving force transmission shaft configured to transmit part of power of the driving force source transmitted to the main driving wheels to the auxiliary driving wheels during 4WD traveling, the first disconnection mechanism disposed on the driving force source side of the driving force transmission shaft, the second disconnection mechanism disposed on the auxiliary driving wheels side of the driving force transmission shaft, the first disconnection mechanism and the second disconnection mechanism being configured to disconnect a power transmission path between the driving force source and the auxiliary driving wheels, the 4WD traveling being traveling with the first disconnection mechanism and the second disconnection mechanism being engaged, one of the first disconnection mechanism and the second disconnection mechanism being a clutch, the clutch having a first rotating member and a second rotating member configured to rotate relative to the first rotating member, and the clutch being configured to control an engagement force while synchronizing a rotation speed of the first rotating member and a rotation speed of the second rotating member, the control device comprising:
an electronic control unit configured to:
determine whether or not to perform a transition to the 4WD traveling during 2WD traveling, the 2WD traveling being traveling with the first disconnection mechanism and the second disconnection mechanism being released,
determine whether or not the 4WD vehicle is in a predetermined traveling state when the transition to the 4WD traveling is not determined,
execute engagement control for controlling the engagement force of the clutch such that the driving force transmission shaft is maintained in a state prior to an initiation of a continuous increase in the rotation speed of the driving force transmission shaft in a case where the electronic control unit determines that the 4WD vehicle is in the predetermined traveling state,
determine that the 4WD vehicle is in the predetermined traveling state (i) when the electronic control unit predicts that a predetermined vehicle wheel speed difference occurs between the main driving wheels and the auxiliary driving wheels or (ii) when the electronic control unit predicts that an understeer state or an oversteer state occurs during the 2WD traveling,
increase the engagement force in executing the engagement control continuously or in stages; and
hold the engagement force at a first value after the initiation of the increase in the rotation speed of the driving force transmission shaft, the first value is lower by a predetermined value than a value of the engagement force at the initiation of the increase in the rotation speed of the driving force transmission shaft.

5. The control device according to claim 4, wherein the electronic control unit is configured to predict whether or not the predetermined vehicle wheel speed difference occurs or predict whether or not any one of the understeer state and the oversteer state occurs based on at least one of states of a low μ road, an uphill road, or steering.

6. The control device according to claim 4, wherein the electronic control unit is configured to:
determine, during the 2WD traveling, whether or not to perform the transition to the 4WD traveling by (i) the electronic control unit determining whether or not a predetermined vehicle wheel speed difference occurs between the main driving wheels and the auxiliary driving wheels or (ii) the electronic control unit determining whether or not any one of an understeer state and an oversteer state occurs, and
increase the engagement force in executing the engagement control such that the clutch is engaged in a case where the electronic control unit determines the transition to the 4WD traveling.

7. The control device according to claim 4, wherein the electronic control unit is configured to control the engagement force at the first value at an initiation of a subsequent engagement control.

8. A control device for a 4WD vehicle, the 4WD vehicle including a driving force source, main driving wheels, auxiliary driving wheels, an automatic transmission, a driving force transmission shaft, a first disconnection mechanism, and a second disconnection mechanism, the automatic transmission disposed in a power transmission path between the driving force source and the main driving wheels, the driving force transmission shaft configured to transmit part of power of the driving force source transmitted to the main driving wheels to the auxiliary driving wheels during 4WD traveling, the first disconnection mechanism disposed on the driving force source side of the driving force transmission shaft, the second disconnection mechanism disposed on the auxiliary driving wheels side of the driving force transmission shaft, the first disconnection mechanism and the second disconnection mechanism being configured to disconnect a power transmission path between the driving force source and the auxiliary driving wheels, the 4WD traveling being traveling with the first disconnection mechanism and the second disconnection mechanism being engaged, one of the first disconnection mechanism and the second disconnection mechanism being a clutch, the clutch having a first rotating member and a second rotating member configured to rotate relative to the first rotating member, and the clutch being configured to control an engagement force while synchronizing a rotation speed of the first rotating member and a rotation speed of the second rotating member, the control device comprising:
an electronic control unit configured to:
execute engagement control for controlling the engagement force of the clutch such that the driving force transmission shaft is maintained in a state prior to an initiation of a continuous increase in the rotation speed of the driving force transmission shaft,
determine whether or not to perform a transition to the 4WD traveling during 2WD traveling, the 2WD traveling being traveling with the first disconnection mechanism and the second disconnection mechanism being released,
determine whether or not the 4WD vehicle is in a predetermined traveling state when the transition to the 4WD traveling is not determined, and
execute the engagement control in a case where the electronic control unit determines that the 4WD vehicle is in the predetermined traveling state,
wherein the electronic control unit is configured to determine, during the 2WD traveling, that the 4WD vehicle is in the predetermined traveling state when a manual transmission device is operated by a driver or when a snow mode is selected by a mode selection device being operated by the driver, the manual transmission device being configured to manually shift the automatic transmission, and the mode selection device having a predetermined normal mode and a predetermined snow mode in which a gear ratio on a high vehicle speed side of the automatic transmission is likely to be selected compared to the predetermined normal mode.

9. The control device according to claim 8, wherein the electronic control unit is configured to:
determine, during the 2WD traveling, whether or not to perform the transition to the 4WD traveling by determining whether or not the shift of the automatic transmission is initiated in a case where the electronic control unit determines that the 4WD vehicle is in the predetermined traveling state by the operation being performed by the driver, and
increase the engagement force in executing the engagement control such that the clutch is engaged in a case where the electronic control unit determines the transition to the 4WD traveling by determining that the shift of the automatic transmission is initiated.

10. The control device according to claim 8, wherein the electronic control unit is configured to control the engagement force of the clutch based on a temperature of a hydraulic oil at the initiation of the engagement control, the hydraulic oil lubricates at least the first rotating member or the second rotating member, and the clutch is configured to cause an increase of the rotation speed of the first rotating member or the rotation speed of the second rotating member as a result of the engagement of the clutch.

11. The control device according to claim 8, wherein the electronic control unit is configured to:
increase the engagement force in executing the engagement control continuously or in stages; and
hold the engagement force at a first value after the initiation of the increase in the rotation speed of the driving force transmission shaft, the first value is lower by a predetermined value than a value of the engagement force at the initiation of the increase in the rotation speed of the driving force transmission shaft.

12. The control device according to claim 11, wherein the electronic control unit is configured to control the engagement force at the first value at an initiation of a subsequent engagement control.

* * * * *